United States Patent [19]

Vollmann

[11] Patent Number: 5,760,996
[45] Date of Patent: Jun. 2, 1998

[54] SYSTEM FOR RECORDING/REPRODUCING SIGNALS ON/ FROM A MAGNETIC TAPE IN A CASSETTE

[75] Inventor: Norbert C. Vollmann, Eindhoven, Netherlands

[73] Assignee: U.S.Philips Corporation, New York, N.Y.

[21] Appl. No.: 927,783

[22] Filed: Aug. 10, 1992

Related U.S. Application Data

[63] Continuation of Ser. No. 545,307, Jun. 26, 1990.

[30] Foreign Application Priority Data

Jun. 26, 1989 [NL] Netherlands ............... 8901605

[51] Int. Cl.⁶ .................... G11B 5/008; G11B 23/02
[52] U.S. Cl. ........................... 360/96.5; 360/132
[58] Field of Search ............... 360/94, 132, 137, 360/106, 96.5; 242/198–201, 347; 369/270

[56] References Cited

U.S. PATENT DOCUMENTS

| D. 331,235 | 11/1992 | Doodson et al. | D14/121 |
|---|---|---|---|
| 3,529,788 | 9/1970 | Sasaki et al. | 242/199 |
| 3,604,790 | 9/1971 | Lano et al. | 242/199 |
| 4,072,992 | 2/1978 | Leshik | 360/94 |
| 4,206,487 | 6/1980 | Sato | 360/94 |
| 4,216,509 | 8/1980 | Sato et al. | 360/94 |
| 4,492,995 | 1/1985 | Tomita et al. | 360/96.5 |
| 4,527,209 | 7/1985 | Martinez | 360/96.5 |
| 4,607,303 | 8/1986 | Cybulski | 360/96.5 |
| 4,642,721 | 2/1987 | Georgens et al. | 360/94 |
| 4,736,903 | 4/1988 | Landry et al. | D14/121 |
| 4,743,984 | 5/1988 | Ryan | 360/132 |
| 4,803,575 | 2/1989 | Nishimura et al. | 360/94 |
| 4,844,377 | 7/1989 | Shiomi et al. | 360/94 |
| 4,937,690 | 6/1990 | Yamashita et al. | 360/94 |
| 4,972,278 | 11/1990 | Hara et al. | 360/94 |
| 5,016,127 | 5/1991 | Inoue et al. | 360/94 |

FOREIGN PATENT DOCUMENTS

| 225973 | 6/1963 | Germany | 360/132 |
|---|---|---|---|
| 53-143211 | 12/1978 | Japan | 360/132 |
| 57-103105 | 6/1982 | Japan | 369/270 |
| 1179290 | 7/1989 | Japan | 360/94 |

*Primary Examiner*—Stuart S. Levy
*Assistant Examiner*—David D. Davis
*Attorney, Agent, or Firm*—Robert M. McDermott

[57] ABSTRACT

A system in which signals can be recorded on or reproduced from a magnetic tape in a cassette, the system comprising standard apparatuses and standard cassettes (29) which are adapted to each other in conformity with a specific standard, which standard cassettes can be positioned correctly on the standard apparatuses by at least one standard locating pin (41) which is engageable in a standard locating aperture (39) of the standard cassette. The standard system is a subsystem of a larger system which also includes deviating apparatuses (1) and deviating cassettes (3) which are adapted to one another in conformity with a deviating standard, which deviating apparatus comprises at least one deviating locating pin (21) which is engageable with clearance in a deviating locating aperture (35A, B) of a deviating cassette but also in a standard locating aperture (37A, B) of a standard cassette, but which deviating locating aperture (35A, B) has such a shape that the standard locating pin (41) is not engageable in the deviating standard aperture.

19 Claims, 5 Drawing Sheets

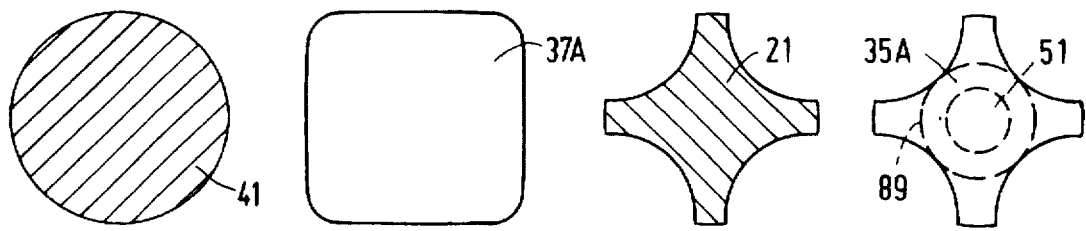
FIG.7A    FIG.7B    FIG.8A    FIG.8B
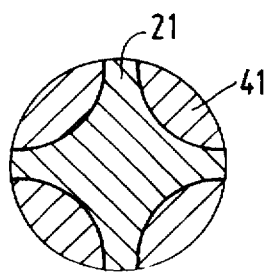 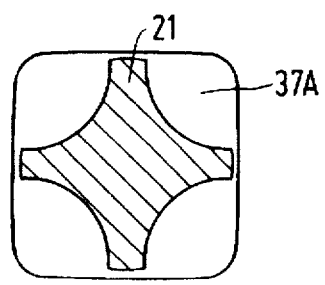
FIG.9    FIG.10
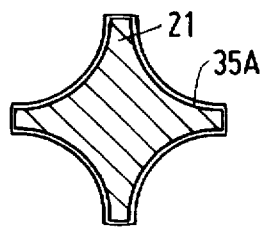 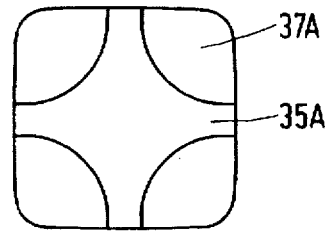
FIG.11    FIG.12
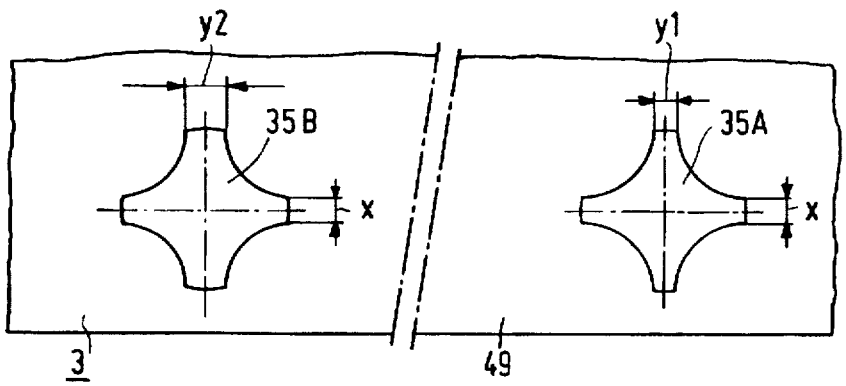
FIG.13

SYSTEM FOR RECORDING/REPRODUCING SIGNALS ON/FROM A MAGNETIC TAPE IN A CASSETTE

This is a continuation of application Ser. No. 07/545,307, filed Jun. 26, 1990.

BACKGROUND OF THE INVENTION

1. Field of the Invention

The invention relates to a system for recording/reproducing signals on/from a magnetic tape in a cassette, which system comprises standard apparatuses and standard cassettes which are adapted to each other in conformity with a specific standard, which standard apparatuses comprise at least one standard locating pin for correctly positioning a standard cassette, and which standard cassettes have at least one standard locating aperture in which the standard locating pin is engageable.

2. Description of Related Art

An example of a system of the type referred to above is the well-known Compact Cassette system in conformity with the international standard IEC 94-7. This system has been enormously successful, which has led to the sale of billions of cassettes and correspondingly huge quantities of associated apparatuses in the more than twenty years it has been on the market. Just like any other standard system the Compact Cassette system leaves only limited room for improvements and innovations. This is because the standard prescribes the principal electrical, magnetic, mechanical and format parameters, so that within the standard there are no or only limited possibilities of deviating from these parameters which are essential for the compatibility between the cassettes and apparatuses belonging to the system.

The Compact Cassette system has been designed for analog recording and reproduction of audio signals. In recent years there has been an enormous evolution in digital technologies for recording and reproducing audio signals. Digital technologies have enabled a substantially higher quality of sound reproduction to be achieved, so that in this respect the Compact Cassette system may be regarded as outmoded. In order to meet the consumer's demand for a system of recording/reproducing digital audio signals on magnetic-tape cassettes, new systems have been proposed in conformity with a new standard, comprising novel cassettes and associated novel apparatuses. In principle, old apparatuses and old cassettes in conformity with an existing standard might be used for the novel digital audio system, requiring the necessary modifications to the apparatuses and perhaps the use of a different magnetic tape. However, the resulting confusion amongst consumers, who would no longer know which cassettes to use in which apparatuses, would be likely to invoke an antagonistic response from the consumer, not only with respect to the new but even with respect to the old system.

The new standard deviates from the old standard. This makes it necessary for the consumer to purchase new equipment with associated new cassettes. This represents a considerable investment, in particular because the manufacture of both the new equipment and the new cassettes requires investments from the manufacturer, leading to higher prices, in particular upon the introduction of the new system. The manufacturer needs time to gain experience with the manufacture of the new products. Therefore, cutbacks in costs through rationalisation and scaled-up production are to be envisaged only after a certain period of time.

For basically the same reasons new systems, such as new digital audio systems but also other new systems, may therefore meet with failure already in the initial stage. The large initial investments made in the development and the start of production may then be regarded as lost, at least partly.

SUMMARY OF THE INVENTION

The invention aims at providing a system of the type defined in the opening paragraph, which lends itself for renovations and innovations which stand a better chance to be successful on the market, and is characterized in that the system also includes deviating apparatuses and deviating cassettes which are adapted to one another in conformity with a deviating standard, which deviating cassettes have at least one locating aperture of deviating shape in which the standard locating pin is not engageable and which deviating apparatuses comprise at least one deviating locating pin which is engageable with some clearance both in the standard locating aperture and in the deviating locating aperture.

The system in accordance with the invention enables innovations and renovations to be made, requiring less new investments from the manufacturer. This is because the new deviating cassettes and apparatuses can remain largely the same, at least mechanically. The new apparatuses can be adapted at least to play the old cassettes which are still in the consumer's possession. There is no risk of the new cassettes being played on an old apparatus because the new cassettes are not accepted by the old standard apparatuses as a result of the deviating shape of the locating aperture. Therefore, the system in accordance with the invention provides upward compatibility, i.e. the system includes the existing standard apparatuses and standard cassettes as a subsystem but adds a new subsystem which allows acceptance of the old standard cassettes but which also includes cassettes which are not accepted by the old standard apparatuses, so that undesirable and confusing mistakes are precluded.

It is to be noted that in a prior U.S. Patent application Ser. No. 532,469 filed by Norbert C. Vollmann et al on May 31, 1990 (herewith incorporated by reference), a system has been proposed comprising apparatuses and cassettes of a first and a second standard type, in which the cassettes of the first standard can be played on apparatuses of the second standard, so that this previously proposed system also provides upward compatibility. In order to avoid confusion on the part of the consumer it is proposed to give the cassettes of the second standard a distinctly different appearance so that even if the cassette is not labelled the cassette differs both in a visual and tactile manner from the cassette of the first standard. It is also proposed to utilise the difference in outward distinctive features between cassettes of the two types in order to detect the type of cassette loaded into an apparatus, if desired in conjunction with means for inhibiting recording and/or reproduction of signals on the cassette. However, no means are provided which simply inhibit the new cassette to be loaded into an old apparatus but which nevertheless allows both the new and the old cassettes to be loaded into a new apparatus. The present invention effectively solves this problem.

An important embodiment is intended to guarantee that in the deviating apparatus, regardless of which of the two types of cassette is inserted, the magnetic tape is always situated at the same level and is characterized in that both types of cassette comprise main walls and each locating aperture is formed in a main wall, the main walls of the cassettes of one type being situated at another distance from the edge of the magnetic tape than those of the cassettes of the other type, and in that the deviating locating pins comprise a standard supporting surface and a deviating supporting face for respectively supporting a standard cassette and a deviating cassette at the location of a locating aperture, which two supporting faces are spaced from one another at a distance equal to the difference between the distances from the main walls of the cassettes to the magnetic tape, so that the magnetic tape of a cassette loaded into the deviating apparatus is always situated at the same position regardless of the type of cassette. For example, in the well-known Compact Cassette the main walls are spaced from each other at a comparatively large distance in relation to the width of the magnetic tape at the location of the locating apertures. In developing the Compact Cassette standard said distance has been so selected to enable magnetic heads to be manufactured with the technologies then available in such a way that they could be accommodated in the space between the main walls of the cassettes. Current technology enables magnetic heads of a smaller height to be manufactured. Thus, if the standard cassettes should be constituted by the well-known Compact Cassettes the deviating cassettes could have a smaller distance between the main walls. The present embodiment of the invention provides a simple and elegant solution to the problem of guaranteeing the correct position of the magnetic tape in the deviating apparatuses, regardless of which of the two cassettes belonging to the system is inserted.

The locating apertures in the cassettes may give rise to the ingress of dust and contaminants into the interior of the cassette, which is undesirable for obvious reasons. In view of this an embodiment of the invention is of interest, which is characterized in that the projection of the deviating locating aperture is situated within the projection of the standard locating aperture. This embodiment guarantees that the deviating locating aperture is not larger than necessary. Preferably, the deviating locating aperture should have such a shape that already at an early stage of the introduction of a standard locating pin into the deviating locating aperture the user is given an indication, that the two elements are not compatible. Therefore, the deviating locating aperture should preferably have a small projection, in particular in the central part. On the other hand, the deviating locating pin should be engageable in a standard locating aperture with the required small clearance so that the periphery of deviating locating pins, and hence deviating locating apertures, would have to coincide with the periphery of a standard locating aperture at least at a number of peripheral locations. Moreover, it is desirable, or at least preferable, that the deviating locating aperture differs from the standard locating aperture in a visually identifiable manner to provide a visible distinction between the two types of cassette. In view of all these requirements an embodiment of the invention is found to be favourable, which is characterized in that the projection of the deviating locating aperture is at least substantially star-shaped.

An embodiment, which is useful for reasons to be explained in the description with reference to the Figures, is characterized in that the deviating locating aperture has substantially the shape of a four-pointed star, whose facing points have connecting lines which extend substantially parallel to and transversely of a front side of the deviating cassette.

A further favourable embodiment of the cassette is characterized in that the cassette has two spaced-apart star-shaped locating apertures for engagement with two spaced-apart deviating locating pins, and one of the two locating apertures is slightly larger to allow for slight differences in distance in the direction of the interconnecting line. Many cassettes, such as for example the aforementioned Compact Cassettes, have two spaced-apart locating apertures adapted to cooperate with two locating pins in the apparatus. The invention guarantees that even in the case of star-shaped deviating locating apertures no problems will arise as a result of differences in distances between the two deviating locating apertures of a cassette and the two deviating locating pins of the deviating apparatuses.

An embodiment which is of interest in order to obtain the deviating locating pin is characterized in that the deviating locating pin comprises a conical portion extending from a free end and having recesses extending along its circumferential surface and terminating in a deviating supporting surface. The terminations of the recesses together automatically form the deviating supporting surface.

A further embodiment is favourable in order to obtain a standard supporting surface. This embodiment is characterized in that the conical portion adjoins a cylindrical portion having a diameter equal to the diameter of a standard locating pin and terminating near the standard supporting surface. In this embodiment the deviating locating pin thus comprises a cylindrical portion which can be substantially identical to the corresponding portion of a standard locating pin on which a conical portion is superposed which deviates from the standard locating pin.

Another very important embodiment is characterized in that the star-shaped locating aperture has a central space and the deviating locating pin has a free end which is engageable with clearance in the central space. It is important that the deviating locating pin and the deviating locating aperture are adapted to one another in such a way that a self-aligning effect is obtained upon introduction of the deviating locating pin into the deviating locating aperture. When a round pin is inserted into a round aperture a small conical pilot edge at the end of the pin is adequate to ensure easy insertion of the pin into the aperture even if the clearance between the pin and the edge of the aperture is small. When a star-shaped locating aperture is used, however, this is different because the locating pin is only engageable in the star-shaped aperture in a number of specific positions. However, in an embodiment as described above an effective self-aligning effect is guaranteed.

In comparison with the standard apparatuses the locating pins in the deviating apparatuses should be replaced by deviating locating pins. However, this is only a minor modification which has no consequences for the mechanical design of the remainder of the apparatus. This means that the manufacturer of the deck of the deviating apparatus can utilise all the experience and knowhow gained in possibly many years of manufacturing the standard apparatuses for manufacturing deviating apparatuses and has to make only small substantially negligible investments in the manufacture of the deviating locating pins.

The invention relates not only to systems of the type defined in the opening paragraph but also to deviating cassettes and deviating apparatuses belonging to such systems.

BRIEF DESCRIPTION OF THE DRAWINGS

The invention will now be described in more detail, by way of example, with reference to the accompanying drawings in which:

FIG. 7A is a highly enlarged sectional view of a standard locating pin.

FIG. 7B shows the outline of a corresponding standard locating aperture.

FIG. 8A is a sectional view of a deviating locating pin.

FIG. 8B shows the outline of an associated deviating locating aperture.

FIG. 9 is the sectional view of FIG. 8A projected onto the sectional view in FIG. 7A.

FIG. 10 shows the sectional view of FIG. 8A projected within the outline of the locating aperture shown in FIG. 7B.

FIG. 11 shows the sectional view of FIG. 8A projected within the outline shown in FIG. 8B.

FIG. 12 shows the outline of FIG. 8B projected onto the outline of FIG. 7B.

FIG. 13 is a plan view of a part of a deviating cassette and, at some distance therefrom, two deviating locating apertures formed in a deviating cassette.

The various Figures are shown to arbitrary scales which are not always the same.

DETAILED DESCRIPTION OF THE PREFERRED EMBODIMENTS

Figure 1:
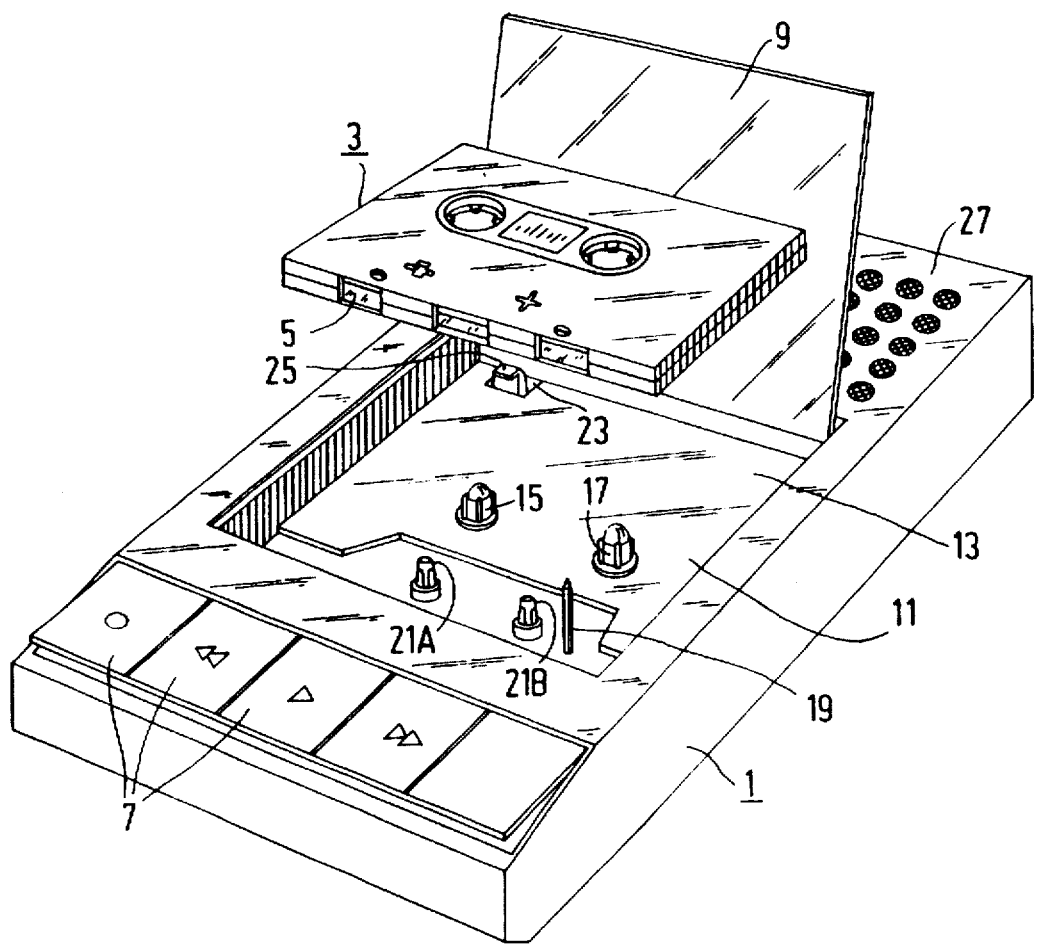
FIG. 1 is a perspective view of a deviating apparatus belonging to a system in accordance with the invention and at some distance therefrom a deviating cassette.

The deviating apparatus 1 shown in FIG. 1 which belongs to the system in accordance with the invention, may be regarded, at least mechanically, as a standard apparatus in accordance with the well-known Compact Cassette standard which is modified in some subordinate respects. The associated deviating magnetic tape cassette 3 may be regarded as a modified Compact Cassette. In the remainder of the description the term "old" is sometimes used instead of "standard" and the term "new" instead of "deviating".

The new cassette 3 is substantially identical to the Compact Cassette, when some modifications to the housing and the use of a different type of magnetic tape 5 are ignored. The apparatus shown is of a basically conventional type and comprises a plurality of actuating keys 7 at the front for function control. A pivotable cover 9 covers a receptacle 11 which is adapted to receive the cassette 3. At the bottom the receptacle 11 is bounded by a deck plate 13 of the mechanical tape deck. Two winding mandrils 15 and 17 and a capstan 19 extend through the deck plate 13. Moreover, the deck plate 13 carries two new locating pins 21A and 21B. At the back of the deck plate 13 an opening 23 is formed through which the end portion of a lever 25 extends, which lever serves for sensing the presence of an aperture in the rear wall of an inserted cassette. The position of the lever 25 controls an anti-erase device. A grill 27 is provided at the rear of the apparatus to allow the passage of the sound radiated by a built-in loudspeaker. Not shown in the drawing but arranged in the interior of the apparatus are a voltage source, for example an accumulator or batteries, and the necessary electrical and electronic elements for cooperation with both the old and the new cassettes and for reproducing and, if applicable, recording audio signals from/on the cassettes.

Figure 2:
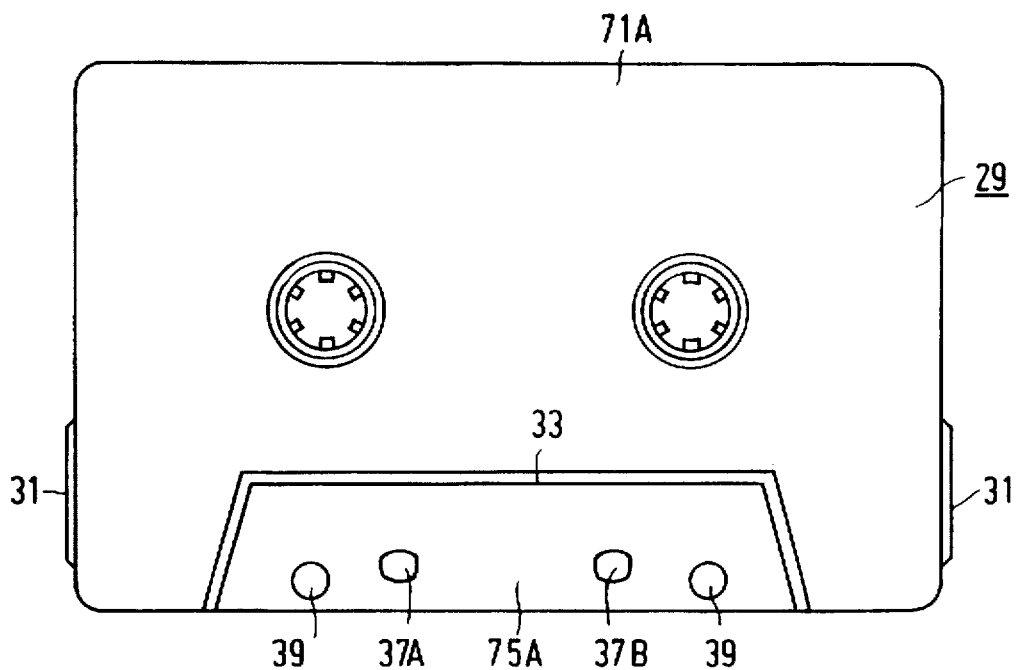
FIG. 2 is a plan view of a standard cassette in conformity with the Compact Cassette standard.
Figure 3:
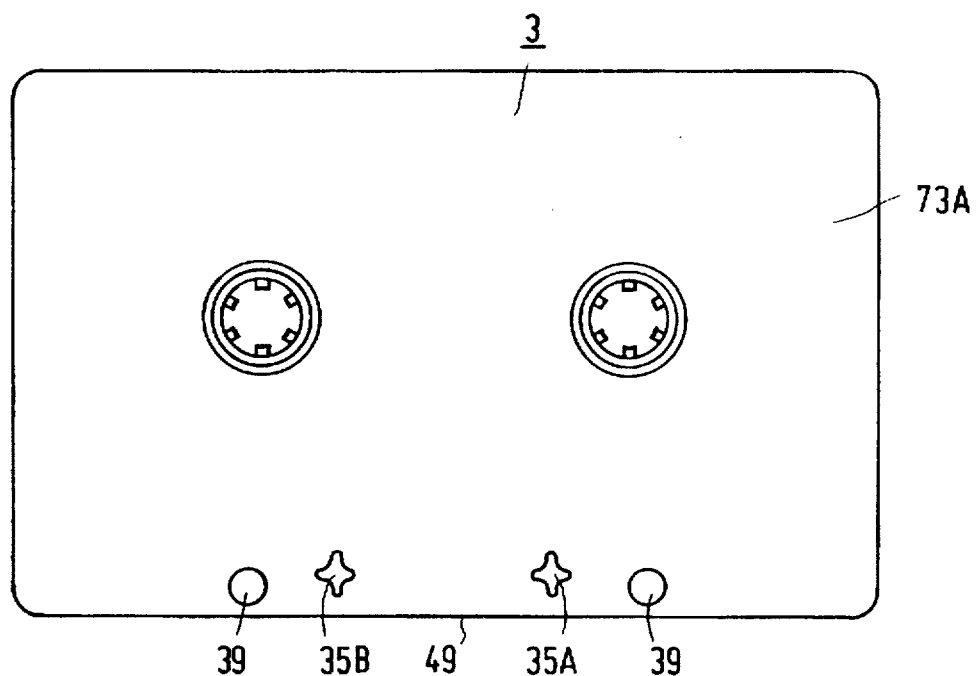
FIG. 3 is a view similar to that in FIG. 2 but showing a deviating cassette.

FIGS. 2 and 3 are plan views of an old cassette 29 and of a new cassette 3. The old cassette is a Compact Cassette. In conformity with the compact cassette standard ridges 31 are formed on opposite sides of the cassette. Moreover, a locally thicker portion 33 is provided at the front of the cassette. The principal dimensions of the new cassette 3 are substantially identical to those of the Compact Cassette but the new cassette does not comprise any ridges or a locally thicker portion similar to the ridges 31 and the thicker portion 33 of the Compact Cassette. As a result of this, in conformity with the aforementioned U.S. application Ser. No. 532,469, there is a distinctly visible and palpable difference between the old and the new cassettes, so that inadvertently interchanging the cassettes of the two types is substantially excluded. As already stated, the Compact Cassette system is intended for analog sound recording and reproduction. The novel system may be intended for digital sound recording in conformity with a new standard which deviates from the Compact Cassette standard. Obviously, the old apparatuses are only suitable for analog sound recording and/or reproduction in conformity with the Compact Cassette standard. However, the new apparatuses 1 may be suitable both for the old analog standard and the new digital standard or at least suitable for playing Compact Cassettes.

The new cassettes 3 have differently shaped locating apertures 35A and 35B. The old cassettes have old locating apertures 37A and 37B. Moreover, both cassettes have identical apertures 39 for the capstan 19.

A comprehensive description of further details of the two cassettes will not be given because Compact Cassettes are well known and the new cassettes merely exhibit modifications relating to the above-mentioned aspects.

Figure 4:
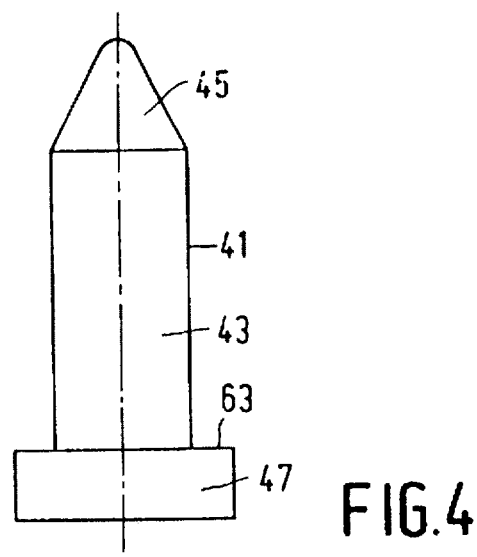
FIG. 4 is a side view of a standard locating pin.

The old locating pin 41 shown in FIG. 4 comprises a cylindrical shank 43, a rounded conical free end portion 45 and, at the other end, a cylindrical portion 47 of larger diameter. The old locating pin 41 is not engageable in the new locating apertures 35A or 35B of the new cassettes 3 but is adapted to engage in the old locating apertures 37A and 37B of the old cassettes 29. The new locating pin 21 is engageable both in the new locating apertures 35A and 35B and in the old locating apertures 37A and 37B.

The new locating apertures 35A and 35B are at least substantially star-shaped in projection. They have substantially the shape of a four-pointed star whose facing points are interconnected by imaginary connecting lines extending substantially parallel to and transversely of the front side 49 of the new cassette 3. The new locating pins 21 comprise a conical portion 53 extending from a free end face 51. Four recesses 55 extend along the circumferential surface of the conical portion 53. These recesses terminate in a new supporting surface 57. The conical portion 53 adjoins a cylindrical portion 59 having a diameter equal to the diameter of the shank 43 of the old locating pin 41. The new locating pin 21 further comprises a cylindrical portion 61 which is identical to the cylindrical portion 47 of the old locating pin. The transition between the portions 43 and 47 of the old locating pin 41 constitutes an old supporting surface 63. The new locating pin 21 has a corresponding old locating surface 65 at the transition between the cylindrical portions 59 and 61. By means of these supporting surfaces the old and new cassettes are positioned in height in the apparatuses, as will be described in more detail hereinafter.

Figure 5:
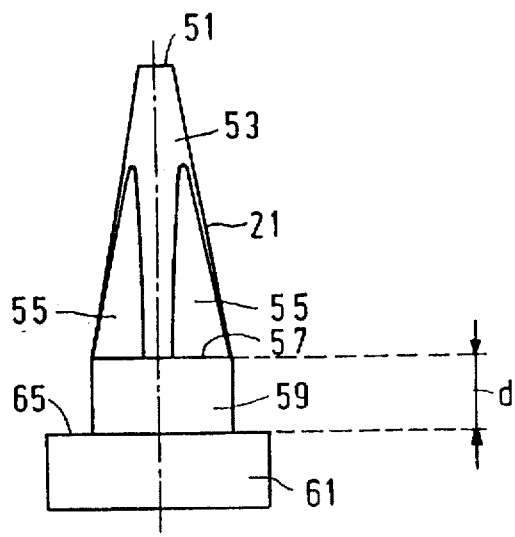
FIG. 5 is a side view of a deviating locating pin.
Figure 6:
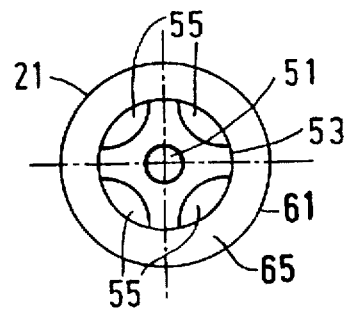
FIG. 6 is a plan view of the deviating locating pin shown in FIG. 5.
Figure 14:
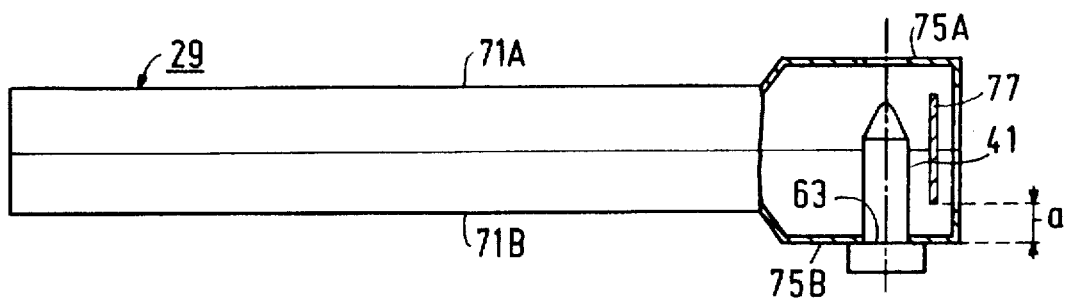
FIG. 14 is a side view, partly sectional view, of a standard cassette and a standard locating pin engaging in a locating aperture.
Figure 15:
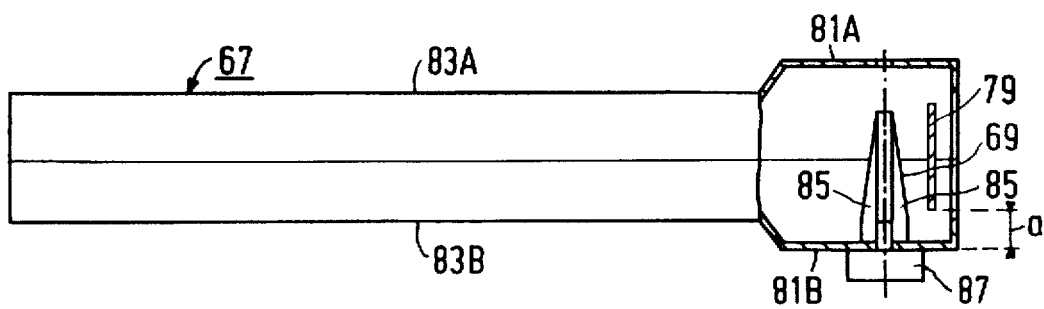
FIG. 15 is a view similar to that shown in FIG. 14 of a deviating cassette and a deviating locating pin.
Figure 16:
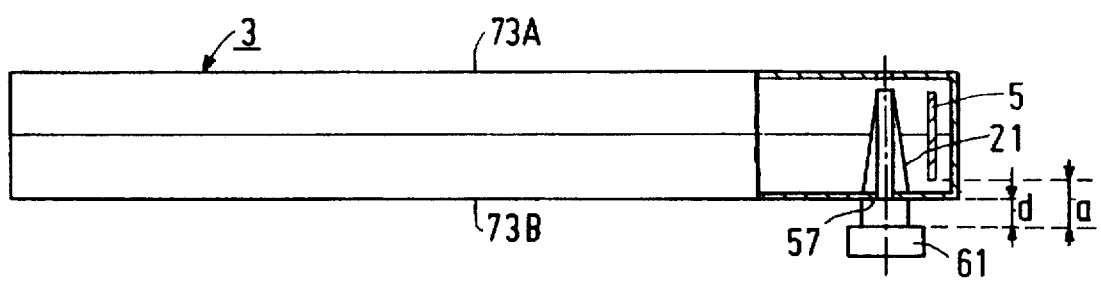
FIG. 16 is a side view similar to FIG. 15 but now showing another deviating cassette.
Figure 17:
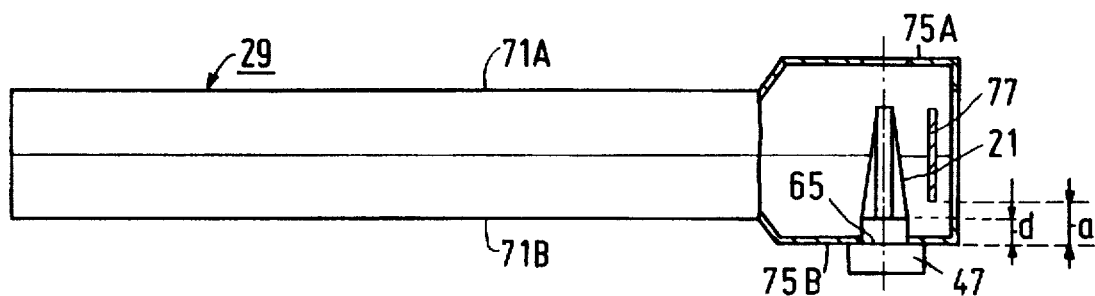
FIG. 17 is a side view similar to FIG. 16 but now showing a standard cassette.

FIGS. 14 and 17 show partly sectional side views of the old cassette 29. FIGS. 15 and 16 show two embodiments of a new cassette, FIG. 16 showing the cassette 3 of FIG. 3 and FIG. 15 showing another new cassette 67. FIG. 14 further shows the old locating pin 41 of FIG. 4 and FIGS. 16 and 17 show the new locating pin 21 of FIGS. 5 and 6. The new locating pin 69 shown in FIG. 15 differs slightly from the new locating pin 21.

FIGS. 14 to 17 do not show any irrelevant details. The old cassette 29 has plane-parallel main walls 71A and 71B. The new cassette 3 has main walls 73A and 73B. The main walls 71A and 71B are spaced at the same distance from each other as the main walls 73A and 73B. At its front the old cassette 29 has a thicker portion 33 (FIG. 2), which is dispensed with in the new cassette 3. As a result of this, the main walls 71A and 71B of the old cassette 29 comprise portions 75A and 75B which are spaced at a larger distance from each other at the location of the thicker portion 33 than walls 71A and 71B. The locating apertures 37A and 37B of the old cassette are formed in this thicker portion. Consequently, the portions 75A and 75B of the main walls of the old cassette are situated at another distance from the edge of the magnetic tape 77 than in the new cassette 3.

In all the cassettes shown in FIGS. 14 to 17 the distance between the supporting surface, which supports the cassette at the location of the locating aperture, and the lower edge of the magnetic tape is equal to a distance a. In all cases the position of the magnetic tapes of the different cassettes relative to the other parts of the deck of the associated apparatuses is therefore the same. When the old cassette 29, see FIG. 14, is loaded into an old apparatus it is positioned by old locating pins 41 and it is supported on an old supporting face 63 of the locating pin. When loaded into a new apparatus the cassette, see FIG. 17, is positioned by new locating pins 21 and is supported on a supporting surface 65 of the new locating pin. When loaded into a new apparatus a new cassette 3, see FIG. 16, is also positioned by the new locating pins 21 and is supported on the new supporting surface 57. The distance d between the supporting surfaces 57 and 65 is selected in such a way that the distance a between the supporting surface and the lower edge of the magnetic tape 5 or 77 is the same in both cases.

FIG. 15 shows that a cassette 67 can even more closely resemble the Compact Cassette 29 than the new cassette 3, which is achieved in that the new cassette 67 comprises portions 81A and 81B of the main walls 83A and 83B which are fully identical to the portions 75A and 75B of the main walls 71A and 71B of the old cassette. In the case of such a new cassette the new locating pin 69 should be of a slightly different construction. As is illustrated in FIG. 15, the new locating pin 69 does not have a cylindrical portion identical to the cylindrical portion 59 (FIG. 5) of the new locating pin 21. The recesses 85 extend into the cylindrical portion 87, whose upper surface constitutes both the old and the new supporting surface.

The new cassette 3 comprises two spaced apart star-shaped locating apertures 35A and 35B (FIG. 3) for engagement with two spaced-apart new locating pins 21A and 21B (the latter not shown). To allow for slight distance tolerances in the direction of the interconnecting line the new locating aperture 35B (FIG. 13) provides some more clearance than the locating aperture 35A. As is shown in FIG. 13 the new locating apertures 35A and 35B have the same dimension x. Conversely, the transverse dimension y1 of the locating aperture 35A is smaller than the dimension y2 of the locating aperture 35B. This illustrates the importance of the use of a four-pointed star shape. The connecting lines between facing points of the star extend in the x-direction and in the y direction. One of the two locating apertures should be slightly larger in the y-direction only. The position of the cassette in the x-direction and in the y direction is well defined.

The star-shaped new locating aperture 35A, see FIG. 8B, has a central space 89 in which the free end 51 of the new locating pin 21 is engageable with clearance. A broken line in FIG. 8B represents the projection of the end face 51 in the central space 89. The Figure clearly shows that the end face fits within the central space 89 with clearance all around, so that the end 51 is readily engageable in the star-shaped new locating apertures 35A even in the case of a slightly inaccurate initial positioning.

FIGS. 7A to 12 illustrate the relationship and the cooperation between the different projections of the locating pins and the locating apertures and require no further explanation. However, it is to be noted that the projection of the new locating aperture 35A does not fall outside the projection of the old locating aperture 37A, see FIG. 12. In principle, it is possible that at least a part of the locating aperture 35A extends beyond the projection of the old locating aperture 37A. However, the projection of the new locating pin 21, see FIG. 10, should always lie within the projection of the old locating aperture 37A. A larger dimension of the new locating aperture 35A therefore has no function and merely increases the likelihood of dust and dirt penetrating the cassette.

In the foregoing the invention has been described for a single exemplary embodiment, the standard system being the Compact Cassette system and the deviating system being a system comprising modified cassettes and apparatuses with star-shaped deviating locating apertures and locating pins. However, this does not mean that the scope of the invention is limited to the embodiment described herein. The standard system need not necessarily be the Compact Cassette system but may alternatively be the VHS video cassette system, the V2000 video cassette system, the 8 mm video cassette system or the RDAT audio cassette system to mention but a few examples. The Compact Cassette system and the deviating system derived therefrom and described herein are systems comprising reversible cassettes. This also applies to the V2000 video system. In said other systems the cassettes are not reversible. However, for the present invention this is irrelevant. The deviating locating apertures need not be star-shaped but, in principle, they may have any shape deviating from the shape of the standard locating aperture, for example polygonal or oval.

I claim:

1. In a recording/reproducing apparatus for use with a magnetic tape cassette, a locating pin having a conical portion extending from a free end, said conical portion having an outer surface and longitudinally extending recesses extending along a portion of said outer surface such that in cross-section transverse to its length dimension said conical portion of said locating pin has the shape of a four-pointed star.

2. In a recording/reproducing apparatus for use with a magnetic tape cassette, a locating pin as claimed in claim 1, having a part opposite said free end which comprises a supporting surface.

3. In a recording/reproducing apparatus for use with a magnetic tape cassette, a locating pin as claimed in claim 2, having a cylindrical portion comprising said supporting surface which is located in a direction away from said free end.

4. In a recording/reproducing apparatus for use with a magnetic tape cassette, a locating pin as claimed in claim 3, having a second cylindrical portion adjoining said supporting surface cylindrical portion in said direction away from said free end.

5. In a recording/reproducing apparatus for use with a magnetic tape cassette, a locating pin as claimed in claim 4, wherein said second cylindrical portion is larger in diameter than the diameter of said supporting surface cylindrical portion.

6. In a recording/reproducing apparatus for use with a magnetic tape cassette, a locating pin as claimed in claim 5 wherein the cross-section of said locating pin has one pair of points which are larger at their extremes than the other pair of points at their extremes.

7. A magnetic tape cassette apparatus for receiving magnetic tape cassettes of a first type and magnetic tape cassettes of a second, different type, the magnetic tapes of both types including a major wall portion having an outer surface and a locating aperture therein, and a length of magnetic tape extending parallel to the major wall portion and including a tape edge spaced from the outer surface of the major wall portion a predetermined distance, the predetermined distance for the cassettes of the first type being different from the predetermined distance for the cassettes of the second type, said magnetic tape cassette apparatus comprising:

a receptacle for receiving both types of magnetic tape cassettes, magnetic head means for communicating with the magnetic tape in both types of cassettes, and a locating pin engageable in the locating apertures of both types of cassettes, said locating pin including a first support surface for supporting the major wall portion of cassettes of the first type and a second supporting surface for supporting the major wall portion of cassettes of the second type, said first and second support surfaces being spaced a distance equal to the difference in said predetermined distance between the cassettes of the first and second type so that the magnetic tapes of both types of cassettes are positioned at the same location with respect to the magnetic head means when the cassettes are arranged in said receptacle and fully received in said locating pin.

8. A magnetic tape cassette apparatus according to claim 7 for cassettes in which the locating aperture of the cassettes of the second type includes an inwardly extending projection such that it does not receive a locating pin of the same diameter as received in the locating aperture of cassettes of the first type, and said predetermined distance is larger for the cassette of the first type than of the second type, wherein:

said locating pin includes a base comprising said first support surface, a cylindrical shank portion extending from said first support surface and sized for receiving the locating aperture of the cassettes of the first type, and a conical portion extending from said shank portion and terminating at a free end, and the conical portion includes a longitudinally extending recess terminating at a second support surface for supporting the projection of the locating aperture of cassettes of the second type.

9. A magnetic tape cassette apparatus according to claim 8, wherein said conical portion of said locating pin has an outer surface and recesses in said outer surface extending along the length dimension thereof such that a cross-section through the conical portion transverse to the length dimension of the locating pin is shaped like a four-pointed star.

10. A magnetic tape cassette apparatus according to claim 9, wherein said apparatus includes two of said locating pins.

11. A magnetic tape cassette apparatus according to claim 9, wherein said free end of said locating pin is sized to fit with clearance in a central space of the locating aperture of the cassette of the second type.

12. The combination of a magnetic tape cassette apparatus and two different types of tape cassettes, the combination comprising:

a first and a second type of magnetic tape cassettes, the cassettes of both types including a major wall portion having an outer surface and a locating aperture therein, and a length of magnetic tape extending parallel to the major wall portion and including a tape edge spaced from the outer surface of the major wall portion a predetermined distance, the predetermined distance for said first type of cassette being different from the predetermined distance for said second type of cassette; and a magnetic tape cassette apparatus, said apparatus comprising a receptacle for receiving both types of said magnetic tape cassettes, magnetic head means for communicating with said magnetic tape in both types of cassettes, and a locating pin engageable in said locating apertures of both types of cassettes, said locating pin including a first support surface for supporting said major wall portion of said first type of cassettes and a second supporting surface for supporting said major wall portion of said second type of cassettes, said first and second support surfaces being spaced a distance equal to said difference in said predetermined distance between said cassettes of said first and second type so that said magnetic tape of both types of cassettes are positioned at the same location with respect to said magnetic head means when said cassettes are received in said receptacle.

13. The combination according to claim 12, wherein:

said locating aperture of said second type of cassette includes an inwardly extending projection such that it does not receive a locating pin of the same diameter as received in said locating aperture of said first type of cassette, and said predetermined distance is larger for said first type of cassette than said second type, and said locating pin includes a base comprising said first support surface, a cylindrical shank portion extending from said first support surface and sized for receiving said locating aperture of said first type of cassette but not said second type, and a conical portion extending from said shank portion, and including a recess terminating at a second support surface for supporting said projection of said locating aperture of said second type of cassette.

14. The combination according to claim 13, wherein said conical portion of said locating pin has an outer surface and recesses in said outer surface extending along the length dimension thereof such that a cross-section through the conical portion transverse to the length dimension of the locating pin has the shape of a four-pointed star.

15. The combination according to claim 14, wherein said locating aperture of said second type of cassette includes a central space, and said free end of said locating pin is sized to fit with clearance in said central space.

16. The combination according to claim 14, wherein said apparatus includes two of said locating pins.

17. The combination according to claim 14, wherein said locating aperture of said second type of cassette has an outer periphery having the shape of a four-pointed star and includes two opposing points aligned with said front wall of said cassette and two opposing points aligned transverse to said front wall.

18. The combination according to claim 17, wherein said second type of cassette includes two of said locating apertures, and said two points aligned transverse to said front wall for one of said locating apertures has a dimension along the direction aligned with said front wall which is greater than the same dimension of the other said locating aperture.

19. The combination according to claim 18, wherein said apparatus includes two of said locating pins.

* * * * *